US010890656B2

(12) United States Patent
Heinen

(10) Patent No.: US 10,890,656 B2
(45) Date of Patent: Jan. 12, 2021

(54) WEAPONS DETECTION SYSTEM USING ULTRA-WIDE BAND RADAR

(71) Applicant: Raytheon Company, Waltham, MA (US)

(72) Inventor: Gregory W. Heinen, Waltham, MA (US)

(73) Assignee: Raytheon Company, Waltham, MA (US)

( * ) Notice: Subject to any disclaimer, the term of this patent is extended or adjusted under 35 U.S.C. 154(b) by 226 days.

(21) Appl. No.: 16/051,915

(22) Filed: Aug. 1, 2018

(65) Prior Publication Data

US 2020/0041640 A1 Feb. 6, 2020

(51) Int. Cl.
| G01S 13/88 | (2006.01) |
| G01S 7/41 | (2006.01) |
| G01S 13/04 | (2006.01) |

(52) U.S. Cl.
CPC .......... *G01S 13/887* (2013.01); *G01S 7/412* (2013.01); *G01S 13/04* (2013.01); *G01S 13/88* (2013.01); *G01S 13/888* (2013.01)

(58) Field of Classification Search
CPC ........ G01S 7/412; G01S 13/88; G01S 13/887; G01S 13/888
See application file for complete search history.

(56) References Cited

U.S. PATENT DOCUMENTS

| 3,478,354 A | 11/1969 | Foster et al. | |
| 6,777,684 B1 * | 8/2004 | Volkov ............... | G01N 21/3581 250/341.1 |

(Continued)

FOREIGN PATENT DOCUMENTS

WO 2009/115818 A2 9/2009

OTHER PUBLICATIONS

Blalock et al., "Measured and FDTD Calculated Ultra Wide Band (UWB) RCS for Treated Test Fixtures," 2008 5th European Radar Conference (EURAD 2008); Oct. 30-31, 2008, Amsterdam, Netherlands, IEEE, Piscataway, NJ, USA, Oct. 30, 2008, pp. 436-439, XP031411521.

(Continued)

*Primary Examiner* — Peter M Bythrow
(74) *Attorney, Agent, or Firm* — Burns & Levinson, LLP; Joseph M. Maraia

(57) ABSTRACT

A system and method for detecting concealed weapons using ultrawideband radar detects weapons based on circumference resonance that are characteristic of reflections for cylindrical or conic portions of a type of weapon, and based on barrel length resonances that are characteristic of barrel lengths of the type of weapon. The circumference resonances are detected using ultrawideband radar in the Mie scattering region based on a range of weapons' characteristic radii to ultrawideband wavelengths. The barrel length resonances are detected using ultrahigh frequency radar in the Mie scattering region based on range of weapons' characteristic lengths to ultrahigh frequency wavelengths. Circumferential resonance patterns and length resonance patterns are combined to provide improved weapon type identification without relying on orientation of the concealed weapons. An array of ultrawideband radar apparatus may be configured to provide synthetic aperture radar imaging of a target area.

20 Claims, 10 Drawing Sheets

Export/Import Restriction Cover Page/US Only

(56) References Cited

U.S. PATENT DOCUMENTS

| | | | |
|---|---|---|---|
| 9,182,481 B2* | 11/2015 | Bowring | G01S 13/887 |
| 9,746,552 B2* | 8/2017 | Bowring | G01S 7/417 |
| 10,466,351 B2* | 11/2019 | Bowring | G01S 7/024 |
| 2011/0181300 A1* | 7/2011 | Bowring | G01S 13/08 |
| | | | 324/637 |
| 2011/0298647 A1* | 12/2011 | Long | G01S 7/412 |
| | | | 342/22 |
| 2016/0061938 A1 | 3/2016 | Hyman et al. | |
| 2016/0097852 A1* | 4/2016 | Bowring | G01S 7/417 |
| | | | 342/22 |
| 2017/0212059 A1* | 7/2017 | Charvat | G01S 13/887 |
| 2017/0315226 A1* | 11/2017 | Bowring | G01S 7/411 |
| 2019/0391256 A1* | 12/2019 | Bowring | G01S 7/417 |

OTHER PUBLICATIONS

Wang et al., "A Comparison of Theoretical, Computational, and Experimental Human Electromagnetic Scattering at VHF and UHF," NAECON 2014—IEEE National Aerospace and Electronics Conference, IEEE, Jun. 24, 2014, pp. 95-102, XP032737875.

Davis et al., "Waveform Diversity for Ultra-Wide Band Surveillance Radars," IET Radar Sonar Naviga, The Institution of Engineering and Technology, UK, vol. 8, No. 9, Dec. 1, 2014, pp. 1226-1233, XP006050866.

International Search Report and Written Opinion from related PCT Application No. PCT/US2019/025747, dated Aug. 22, 2019.

\* cited by examiner

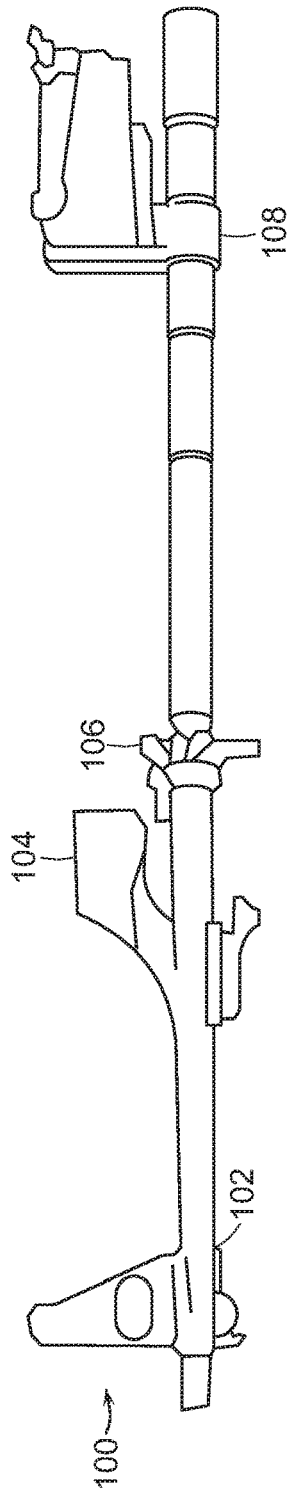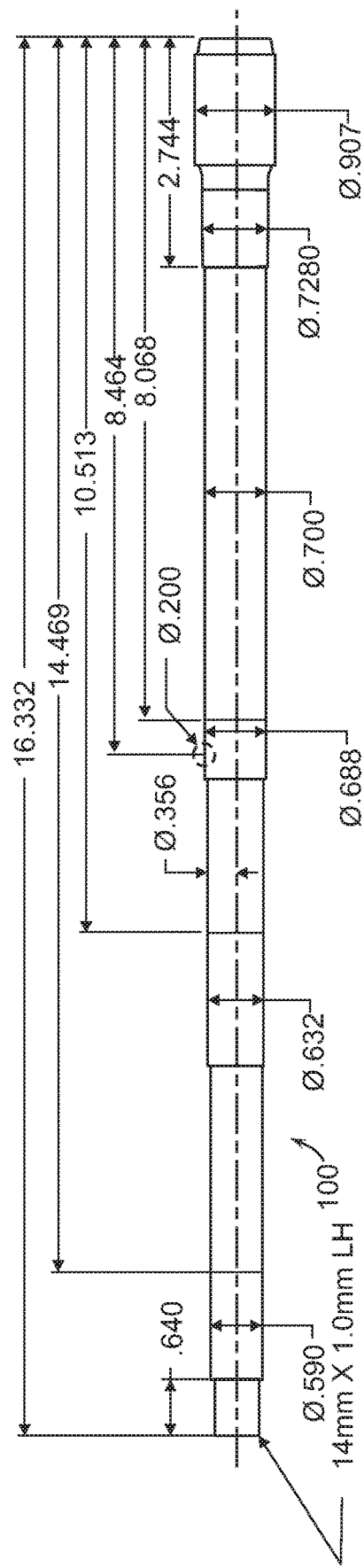
FIG. 1A
FIG. 1B

5.3 GHz λ 56 mm

- Rifle: 14mm
  - Mie: 14/56=0.25

- Rifle: 15mm
  - Mie: 15/56=0.27

- Rifle: 17mm
  - Mie: 17/56=0.31

- Rifle: 18mm
  - Mie: 18/56=0.32

3 GHz λ 100 mm

- Rifle: 14mm
  - Mie: 14/100=0.14

- Rifle: 15mm
  - Mie: 15/100=0.15

- Rifle: 17mm
  - Mie: 17/100=0.17

- Rifle: 18mm
  - Mie: 18/100=0.18

FIG. 5

WEAPONS DETECTION SYSTEM USING ULTRA-WIDE BAND RADAR

FIELD OF TECHNOLOGY

The present disclosure relates generally to the field of weapons detection systems, and more specifically to systems and methods for detecting and identifying weapons using ultrawide band radar.

BACKGROUND

Sniper detection systems have been developed to detect the presence of a gun or rifle by measuring acoustic shockwaves that occurs when the gun is fired using an array of sensors. These are not useful to detect the presence of a weapon before it is fired. Other systems are known which can detect light reflected by of the optics in a gun scope. These systems are not useful to detect weapons that are not equipped with optics and can only detect weapons from certain viewing angles.

Another previous weapons detection technique involves the use of radio waves to detect the presence of objects based on the resonance properties of the object. For example, U.S. Patent Application Publication No. 2010/0079280 by Lacaze et al. discloses that a tailor-made signal can be configured to resonate with specific objects, such as the barrel cavity of a gun. The resonated signal is reflected to a receiver that processes the signal and attempts to identify the presence and type of weapon by comparison with a library of tailor-made signals that are known to produce such resonance in specific weapons. The technique disclosed by Lacaze only detects a weapon if the signal is specifically tailored to interact with the weapon so as to create a specific signature in the frequency domain.

U.S. Pat. No. 8,890,745 by Wahlquist et al. describes weapon and object detection systems and methods that detect, among other things, a gun aimed at a target before the gun is fired. A unique backscattering signature is generated using radio frequency (RF) signals reflected off of an object. The signature is compared with pre-determined backscattering signatures using statistical analyses to detect the presence and type of the object. A warning is provided to the target if the object is identified as a gun or other threatening object. The technique described by Wahlquist relies on the orientation of a weapon relative to a target and does not include detecting weapons that are not being aimed, for example.

U.S. Pat. No. 8,362,945 by Nguyen et al. describes systems and methods for detecting and tracking a gun using millimeter waves or radio frequency waves. The method involves storing empirical data for multiple types of guns, including information indicative of a resonant frequency of a barrel of each of the types of guns, generating pulse energy including at least one sequence of pulses at millimeter wave frequencies for each of the guns, transmitting the pulse energy, receiving reflected pulse energy, filtering the reflected pulse energy to a preselected bandwidth for each of the guns, determining a first maximum value of the filtered reflected pulse energy in each of the preselected bandwidths that exceeds a preselected threshold, determining a second maximum value among the first maximum values, and correlating a frequency of the second maximum value with the stored resonant frequencies of the guns to identify a gun.

U.S. Pat. No. 8,610,622 by Sullivan et al. describes a method of weapon threat detection that involves transmitting radar signals towards a potential threat, receiving reflected radar signals that have been reflected from the potential threat, and employing signal processing to determine if a weapon barrel is pointed at or near a target of interest by a potential or continuing threat. A processor compares radio frequency signals to a library of radio frequency signatures and/or patterns for a plurality of different firearms to identify firearms in the zone of interest.

The techniques described by Nguyen and Sullivan characterizes weapons based reflected pulse energy in frequency ranges associated with barrel length resonances. Thus, the characterizations generated by the Nguyen technique are based primarily on the barrel length of a detected weapon. This may cause misidentification of a weapon as another having a similar barrel lengths, for example.

These and similar previously known systems and methods for identifying concealed weapons are often inaccurate and prone to false alarms. Moreover some of the previously known systems and methods are unable to detect or identify weapons that are disadvantageously oriented relative to the respective system's emitter and/or receiver.

SUMMARY

An aspect of the present disclosure includes an apparatus for reliable detecting concealed weapons and caches of weapons. The apparatus includes a dual band signature analyzer that is configured to independently detect circumference and barrel length of detected weapons.

A system for detecting concealed weapons according to an aspect of the present disclosure includes a first radar emitter configured for emitting electromagnetic energy in an ultrawideband frequency range, a first radar receiver configured for receiving reflected electromagnetic energy in the ultrawideband frequency range, and a first processing circuit coupled to the first receiver. In an illustrative embodiment, the electromagnetic energy emitted by the first radar emitter in the ultrawideband frequency range has a frequency of between 3 gigahertz and 5.3 gigahertz. The reflected electromagnetic energy in the ultrawideband frequency range was emitted from the first emitter and reflected to the first receiver at one or more circumferential resonance frequencies. The circumferential resonance frequencies may correspond to a circumference of a target weapon. The first processing circuit configured to determine circumferential resonance frequencies of the reflected electromagnetic energy in the ultrawideband frequency range and to compute the circumference of the target weapon based on the circumferential resonance frequencies.

The disclosed system for detecting concealed weapons also includes a second radar emitter configured for emitting electromagnetic energy in an ultra-high frequency and/or very high frequency range, a second radar receiver configured for receiving reflected electromagnetic energy in the ultra-high frequency and/or very high frequency range, and a second processing circuit coupled to the second receiver. In an illustrative embodiment, the electromagnetic energy emitted by the second radar emitter in the ultrahigh frequency range has a frequency between 200 megahertz and 900 megahertz. The reflected electromagnetic energy in the ultra-high frequency and/or very high frequency range was emitted from the second emitter and reflected to the second receiver at one or more length resonance frequencies. The length resonance frequencies may correspond to a length of the target weapon. The second processing circuit is configured to determine the length resonance frequencies of the reflected electromagnetic energy in the ultra-high frequency and/or very high frequency range and to compute the target length based on the length resonance frequencies. According to aspects of the present disclosure, the circumferential resonance frequencies and the length resonances frequencies are in a Mie scattering region.

The disclosed system for detecting concealed weapons also includes a third processing circuit coupled to the first processing circuit and the second processing circuit. The third processing circuit is configured to compare the target length and the target circumference to a predetermined list of length characteristics and circumference characteristics of corresponding weapons types, and to identify a weapon type of the target based on the comparison.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

FIG. 1A shows a profile of a weapon barrel having a number of cylindrical portions that can be identified as a characteristic of a weapon type according to an aspect of the present disclosure;

FIG. 1B shows a profile of a weapon barrel having a length that can be identified as a characteristic of a weapon type according to an aspect of the present disclosure;

FIG. 5 is table showing ratios of rifle barrel diameter to wavelength in the Mie scattering region according to aspects of the present disclosure;

DETAILED DESCRIPTION

Figure 2:
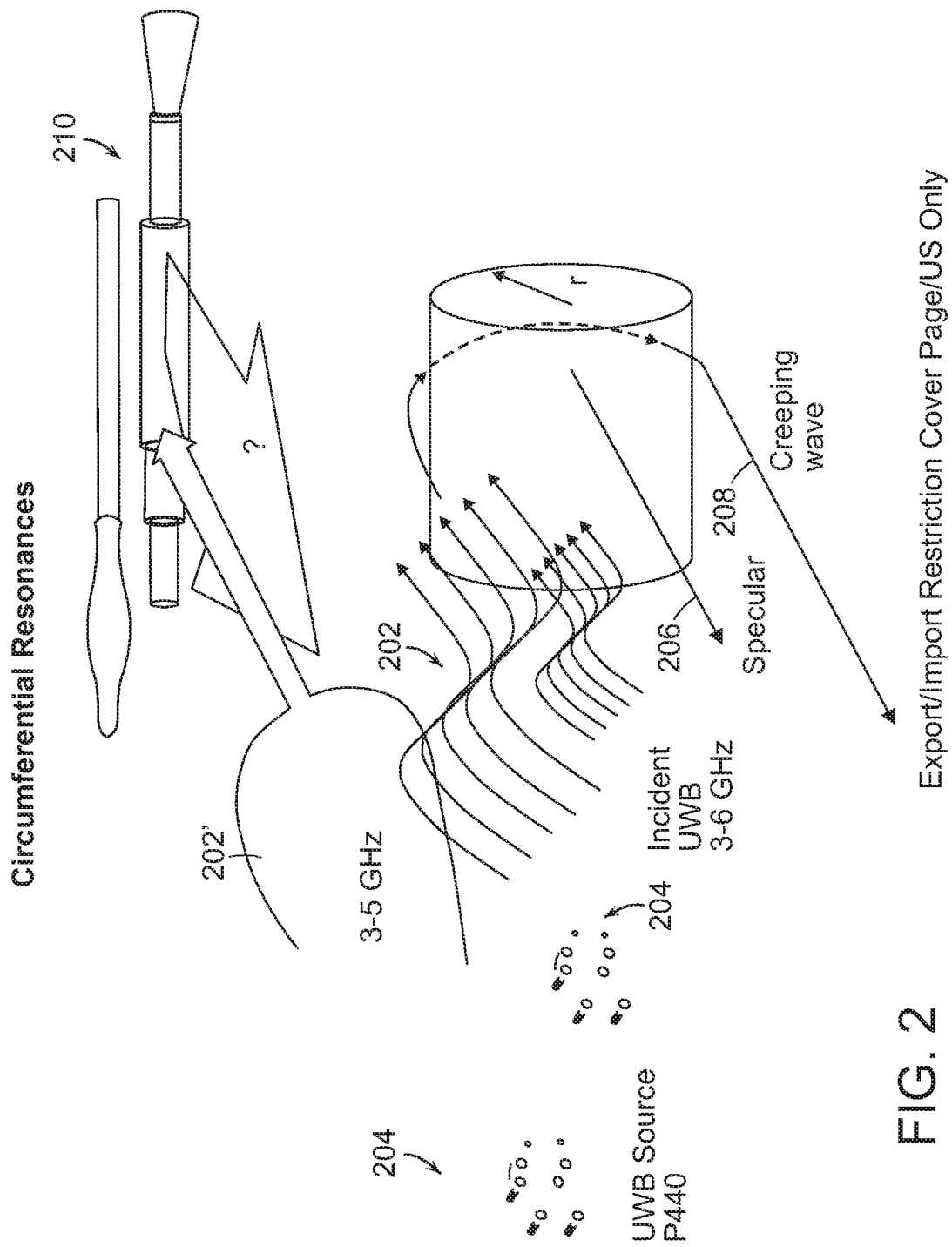
FIG. 2 is in illustrative diagram showing circumferential resonances generated by incident ultrawideband radiation impinging on a cylindrical portion of a weapon according to an aspect of the present disclosure.

Aspects of the present disclosure includes apparatus and methods for reliably detecting and identifying concealed weapons, weapons caches and improvised electronic device (IED) shapes. The disclosed apparatus and methods are capable of detecting weapons barrels and other cylindrically shaped targets independently of the orientation of the barrels and cylinders, i.e., the incidence angle of the target, relative to the apparatus. This provides substantial improvement of weapons detection over previous systems and techniques that detect weapons aimed at the apparatus, for example. Ultra-high frequency bands used according to aspects of the present disclosure penetrate buildings well to facilitate detection of weapons caches before or during deployment of the weapons for an attack. According to an aspect of the present disclosure, false detections may be reduced by using synthetic aperture radar scanning with a linear array or two dimensional radar array of radar transceivers or by using ad-hoc radar arrays with radio frequency switching.

According to an aspect of the present disclosure, the apparatus may be tuned to an appropriate spectral region for optimal detection of weapons according to their circumference. For example, it has been determined that an optimal portion of the Mie region for detecting weapons based on their circumference is where the ratio of circumference to wavelength is about 1 to 5. According to another aspect of the present disclosure, ultrahigh frequency signals are used to detect weapons according to their barrel length resonances in the same Mie region. The types of weapons that may be detected using the disclosed apparatus and methods includes rocket propelled grenades (RPGs) and shaped IEDs that are most often encountered in a modern battlespace.

The physical profiles of commonly encountered weapons generally includes some combination of cylindrical portions and conic portions having a characteristic combination of circumferences and lengths. For example, referring to FIG. 1A, a particular model of an AK-47 rifle barrel 100 has a cylindrical front sight base portion 102 having a diameter of 0.585 inches, a cylindrical gas block portion 104 having a diameter of 0.624 inches, a cylindrical handguard retainer portion 106 having a diameter of 0.682 inches and a cylindrical rear sight base portion 108 having a diameter of 0.723 inches. Referring to FIG. 1B the rifle barrel 100 of a particular model of the AK-47 rifle has characteristic barrel length of about 16.3 inches.

Referring to FIG. 2, the various diameters of portions of a concealed weapon resonate when electromagnetic radiation 202 at certain wavelengths are incident upon and are reflected by the weapons. For example, when an ultrawideband radar emitter 204 directs electromagnetic radiation 202' in the range of 3 GHz to 5 GHz, an interaction between a specular reflection 206 of the radiation and a creeping wave return 208 can resonate at certain frequencies that depend on the circumference of a target weapon 210.

Figure 3:
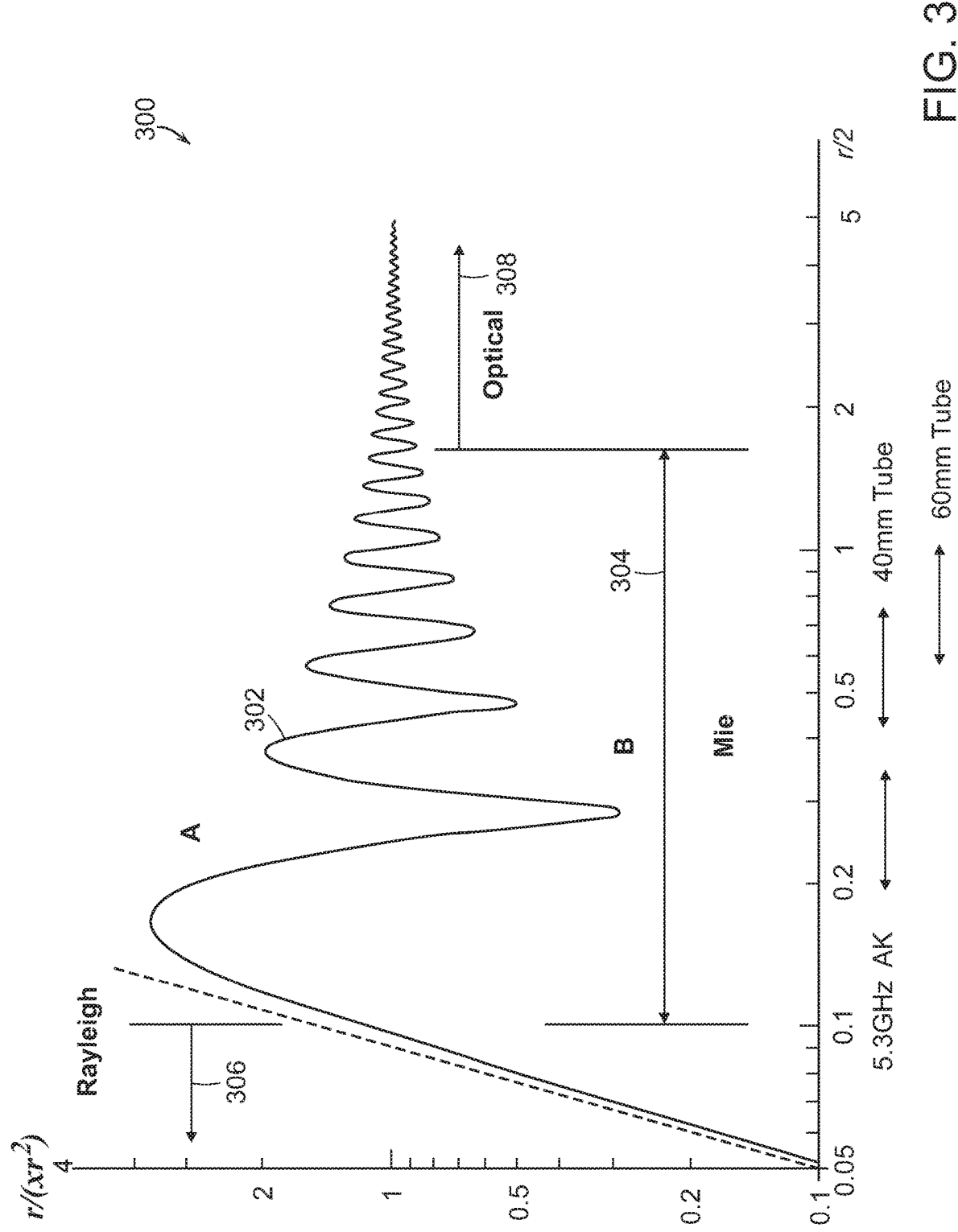
FIG. 3 is graph showing circumferential resonances in the Mie scattering region and corresponding ranges of the Mie scattering region associated with certain weapons types resonating at particular frequencies according to an aspect of the present disclosure.

Resonances that depend on the circumference of a target weapon generally occur when the wavelength of the incident radiation is within about one order of magnitude of the target weapon diameter. The optimal wavelength range for detecting and identifying weapons based on circumferential resonances is a region called the Mie scattering region, which is defined as the region where a ratio (r/λ) of target radius to incident wavelength is 0.1 to about 1.7. FIG. 3 is a graph 300 of reflected signal resonances for different scattering regions of a reflected radar signal. The graph 300 shows that a reflected signal resonance 302 is much greater in the Mie scattering region 304 than in the Rayleigh scattering region 306 or optical scattering region 308, for example.

Figure 4:
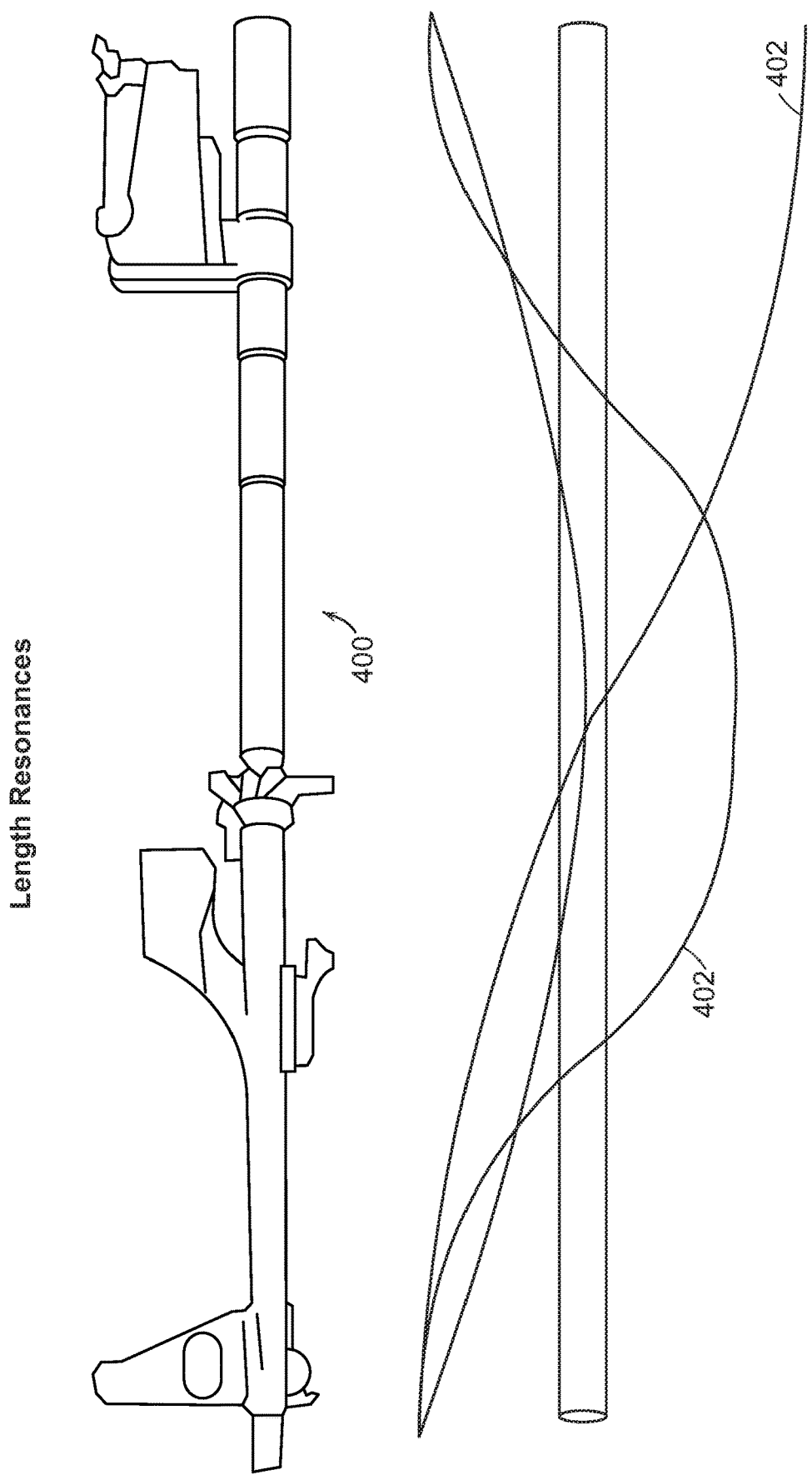
FIG. 4 is an illustrative diagram showing barrel length resonances generated by incident ultra-high frequency radiation impinging on a weapon barrel according to an aspect of the present disclosure.

According to another aspect of the present disclosure, the barrel or tube portions of a concealed weapon resonate when electromagnetic radiation at certain ultra-high frequency (UHF) wavelengths and/or certain very high frequency (VHF) wavelengths are incident upon and are reflected by the weapons. For example, when an ultrawideband radar emitter directs electromagnetic radiation in the range of about 200 MHz to 900 MHz, a barrel or tube portion will resonate at certain frequencies that depend on its length. Referring to FIG. 4, a weapon barrel 400 of target weapon may act as a first mode resonator at one half wavelength of the electromagnetic radiation for wavelength of incident radiation that are the same as the barrel length 402 and may act as second mode monopole resonator at the wavelength of the electromagnetic radiation for wavelengths of the incident radiation that are double the barrel length 404. This corresponds to wavelengths on the order of 10 cm to 73 cm (UHF), depending on the barrel length. Although a ground plane may not be present as in a typical monopole antenna, the proximity, interrogation power and susceptibility to polarization are factors that increase the re-radiated waveform. Because UHF radiation is highly susceptibility to polarization, an illustrative embodiment of the disclosed apparatus may include a variable polarization transmitter and receiver antenna type.

FIG. 5 shows a table 500 of ratios (r/λ) corresponding to rifle barrels having a diameter of 14 mm, 15 mm, 17 mm and 18 mm and incident electromagnetic radiation having a wavelength of 56 mm (5.3 GHz) and 100 mm (3.0 GHz). It can be seen that these ratios (r/λ) of target radius to incident wavelength range from 0.14 to 0.32. As shown in FIG. 3, these ratios are within the Mie scattering region. This indicates that incident electromagnetic radiation in the frequency range of 3.0 GHz to 5.3 GHz is effective to cause circumferential resonance with target rifles having barrel diameters from 14 mm to 17 mm. FIG. 3 also shows that the ratios (r/λ) of target radius to incident wavelength is within the Mie scattering region 304 when radiation in the frequency range of 3.0 GHz to 5.3 GHz reflects from target rifles having barrel diameters from 14 mm to 17 mm as well as from other weapons such as a 40 mm or 60 mm rocket propelled grenade tube, for example.

According to an aspect of the present disclosure, a database of resonance signatures corresponding to particular types of weapons is generated and stored. The resonance signatures include circumferential resonance patterns that have been observed or computed in reflections from particular weapons in response to a range frequencies of incident electromagnetic radiation in the Mie scattering region. The resonance signatures for each of the particular types of weapons also include length resonance patterns that have been observed or computed in reflections from the particular types of weapons in response to a range frequencies of incident electromagnetic radiation in the Mie scattering region.

Figure 6:
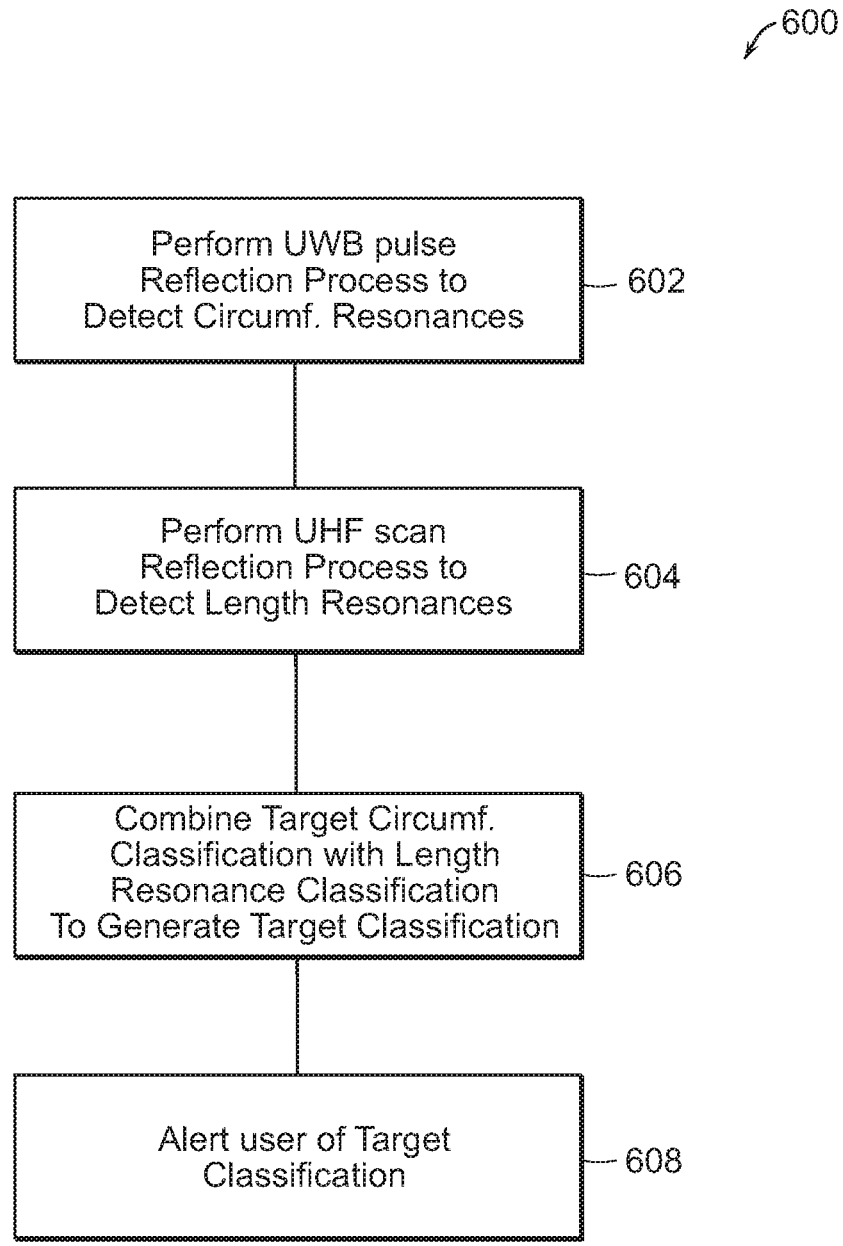
FIG. 6 is a process flow diagram showing a method for identifying concealed weapons according to an aspect of the present disclosure.

A weapons detection method according to an aspect of the present disclosure is described with reference to FIG. 6. The weapons detection method 600 includes performing an ultrawideband pulse reflection process at step 602 and performing an ultra-high frequency scan reflection process at step 604. The ultrawideband pulse reflection process is used for circumferential resonance detection and generates a target circumference classification. The ultra-high frequency scan reflection process is used for length resonance detection and generates a target length classification. At step 606, the method includes combining the target circumference classification and target length classification to generate a target classification. At step 608, the method includes alerting a user of the target classification to identify the detected weapons and/or weapons caches.

Figure 7:
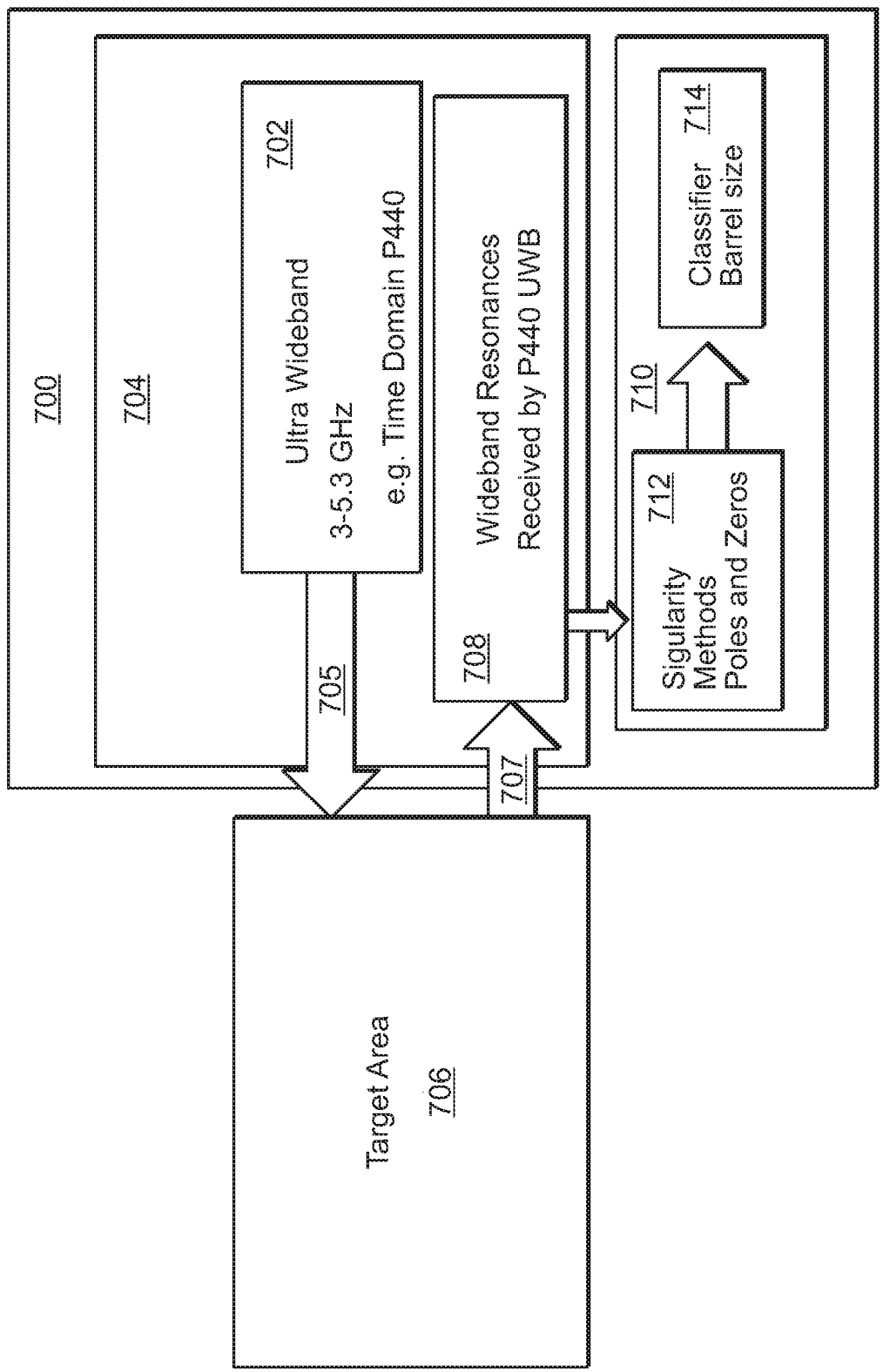
FIG. 7 is a system block diagram showing a first sub-system for performing an ultrawideband pulse reflection process according to an aspect of the present disclosure.

A first sub-system of a weapons detection system according to an aspect of the present disclosure is described with reference to FIG. 7. The first sub-system 700 is configured to derive a classification of barrel size and ultimately a barrel type, or a weapon type, using ultrawideband radar in a parallel processing scheme that also involves a second sub-system of the weapons detection system using UHG/VHF radar as described herein with reference to FIG. 8. Using differing methods provides a higher probability of weapons identification.

In an illustrative embodiment, the first sub-system 700 is configured for performing the ultrawideband pulse reflection process described above with reference to step 602 of FIG. 6. The first sub-system 700 includes a radar apparatus 704 coupled to target circumference processing circuitry 710. In an illustrative embodiment, ultrawideband electromagnetic radiation 705 is transmitted from ultrawideband transmitter circuitry 702 of the radar apparatus 704 toward a target area 706 and reflected by items in the target area 706. According to an aspect of the present disclosure, the ultrawideband electromagnetic radiation 705 may be transmitted and/or received with dual polarization to detect targets oriented at large angles of incidence.

The ultrawideband electromagnetic radiation 705 pulses transmitted by the radar apparatus 704 may be either monostatic, bistatic or polystatic radar pulses. The target area may contains barrels, weapons, or rounds that have characteristic circumference, grouped by means of the target being captured by the UWB beam. The UWB beam is typically 60 degree width or may be narrower for higher specificity of angle. The target returns immediate reflection, Mie scattering or some combination thereof. Some of the radar returns are delayed relative to immediate reflections as the radar pulse wraps around the circumference of an object. Wideband resonances are associated with a circumference signature of a conducting cylinder, sphere or solid.

According to an aspect of the present disclosure, the transmitter circuitry 702 may tuned to transmit the ultrawideband electromagnetic radiation 705 in the range of about 3.0 GHz to 5.3 GHz, for example. In an illustrative embodiment, ultrawideband notch filters may be used for tuning the radar apparatus 704 in the Mie region. Reflected wideband electromagnetic radiation resonances 707 from the target area 706 are received by ultrawideband receiver circuitry 708 of the radar apparatus 704.

The target circumference processing circuitry 710 is configured for classifying detected items as types of weapons or caches of weapons based on circumference resonances detected in electromagnetic radiation reflected from the target area. In an illustrative embodiment, the target circumference processing circuitry 710 includes circumferential resonance detection circuitry 712 coupled to barrel size classifier circuitry 714. The circumferential resonance detection circuitry 712 is configured to process the reflected wideband electromagnetic radiation resonances 707 and to identify natural resonant frequencies reflected from the target area 706. The barrel size classifier circuitry 714 is configured to compute a circumference of the items in the target area 706 based on the identified natural resonant frequencies. In an illustrative embodiment, the circumferential resonance detection circuitry 712 is configured to process the reflected wideband electromagnetic radiation resonances 707 using previously known singularity expansion methods, which may include detection via poles/zeroes using maximum likelihood techniques, for example.

Well known singularity evaluation methods, such as Proney methods, matrix Pencil methods, for example, Fourier Series, or combinations of these methods in parallel, may be implemented by the circumferential resonance detection circuitry 712 to extract poles and zeros from the wideband resonances. The poles and zeroes may be diagrammed to provide 2d mappings that can be compared to an a-priori database of such maps. The comparison is used to identify combinations of cylindrical (circumferences) that match known weapons. The poles and zeros in a map may be compared by the barrel size classification circuitry 714 to an a-priori database using methods which evaluate the spread, grouping, and diversity of poles and zeros. The comparison correlates the measured poles and zeros maps to the poles and zeros maps of known weapons or known items such as rebar, common articles such as pots and pans, etc. The barrel size classifier circuitry 714 may implement methods that use moments and weighted moments or methods that involve statistical groupings of poles and zeros, for example.

The circumferential resonance detection techniques described herein exploit the full Mie scattering region and are invariant to viewing aspect. In an illustrative embodiment, the Mie scattering region for circumferential resonance detection corresponds to ratios of target circumference to wavelength of the transmitted electromagnetic radiation of about 1:6. In the illustrative embodiment, a transmitted frequency range of 3.0 to 5.3 GHz is used for circumferential resonance detection. This frequency range resonates with targets having a circumferences in the range of about 7 cm to 42 cm, i.e., a diameter of about 2 inches to about 14 inches.

Figure 8:
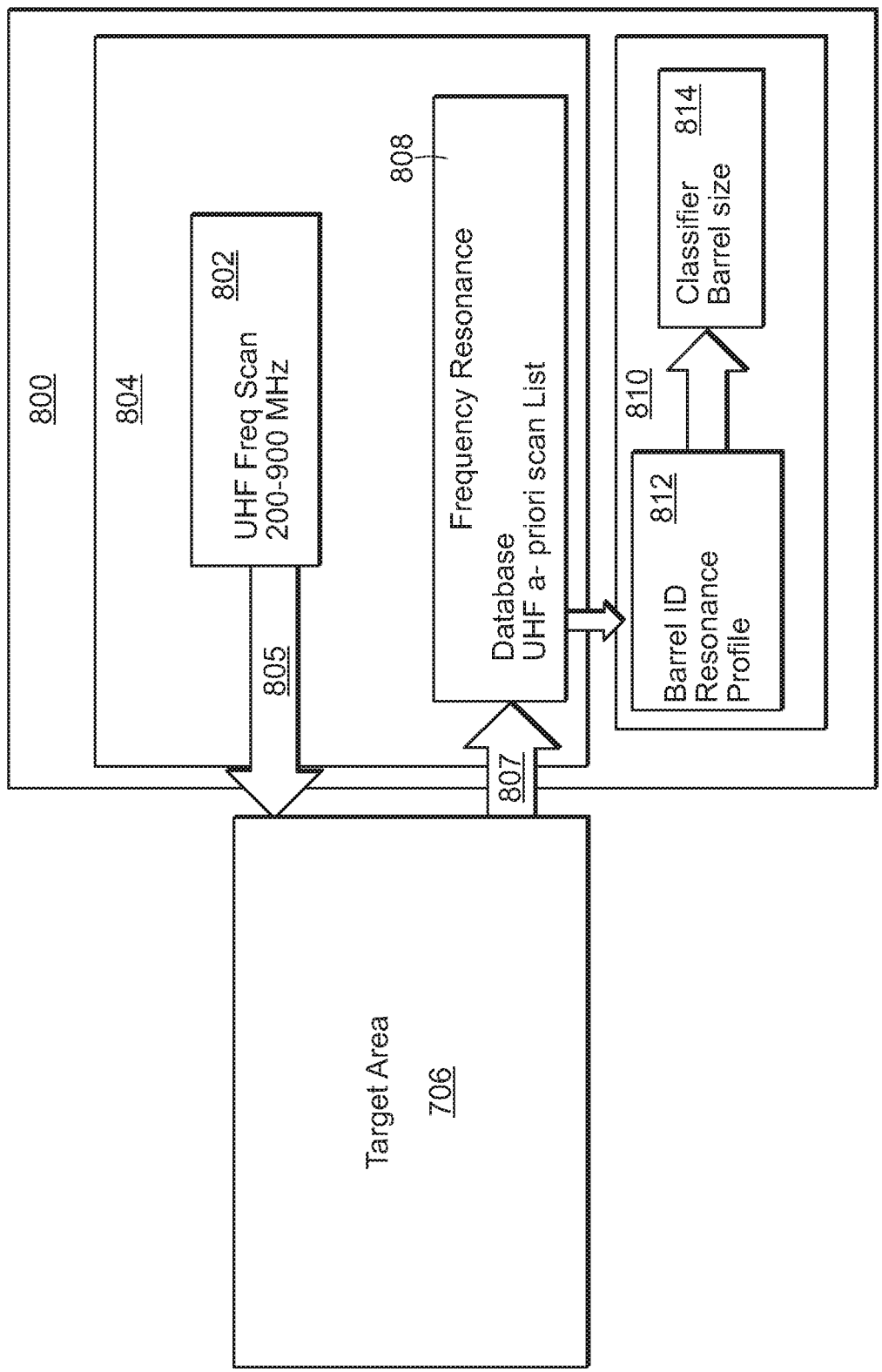
FIG. 8 is a system block diagram showing a second sub-system for performing an ultra-high frequency scan reflection process according to an aspect of the present disclosure.

A second sub-system of the weapons detection system according to an aspect of the present disclosure is described with reference to FIG. 8. In an illustrative embodiment, the second sub-system 800 is configured for performing the ultra-high frequency scan reflection process 604 (FIG. 6) according to an aspect of the present disclosure. In an illustrative embodiment, the second sub-system 800 is configured to derive a classification of barrel length based on the return waveform of a software defined radar that can operate in the UHF frequency range, the VHF frequency range or both. In the UHF frequency range, a mid-band wavelength is about 73 cm. So a waveform returned from a weapon's barrel that is 73 cm in length may include a first mode (full wavelength) and a weapon's barrel that is 36 cm in length, may appear as a second mode (½ wavelength) in the returned waveform. The resonance in the returned waveform are delayed more than a reflected non-resonant waveform. Resonances in the return signal can be discerned based on their delay.

In an illustrative embodiment the second subsystem may also be configured to operate in the VHF frequency range. In the VHF frequency range, the second-subsystem can generate pulses which are VHF, having a 2 m full wavelength mid band, or 1 m half wavelength mid band, for example.

The second sub-system 800 includes a radar apparatus 804 coupled to target length processing circuitry 810. The radar apparatus 804, may be a software defined radar (SDR), for example. In an illustrative embodiment ultra-high frequency electromagnetic radiation 805 is transmitted from ultra-high frequency transmitter circuitry 802 of the radar apparatus 804 toward the target area 706 and reflected by items in the target area 706. The transmitted ultra-high frequency electromagnetic radiation may scan a range of frequencies from about 200 MHz to about 900 MHz, for example. According to an aspects of the present disclosure, dual polarized ultra-high frequency electromagnetic radiation may be transmitted by the radar apparatus 804 to detect aligned targets such as a cache of weapons stacked or stored in alignment with each other, for example. Reflected ultra-high frequency electromagnetic radiation resonances 807 from the target area 706 are received by ultra-high frequency receiver circuitry 808 of the radar apparatus 804.

Target length processing circuitry 810 is configured for classifying detected items as types of weapons or caches of weapons based on length resonances detected in electromagnetic radiation reflected from the target area. In an illustrative embodiment, the target length processing circuitry 810 includes length resonance detection circuitry 812 coupled to barrel size classifier circuitry 814. The length resonance detection circuitry 812 is configured to process the reflected ultra-high frequency electromagnetic radiation resonances and to identify natural resonant frequencies reflected from the target area 706. The barrel size classifier circuitry 814 is configured to compute a length of the items in the target area 706 based on the identified natural resonant frequencies. In an illustrative embodiment, the electromagnetic radiation that is returned as reflections or re-radiated delayed waveforms received by the ultra-high frequency receiver circuitry 804 is compared by the barrel length detection circuitry 812 to a-priori scanned weapon waveforms that correspond to barrels of known weapons or other length based indicators to determine length ranges of target objects. The classifier circuitry 814 matches the length ranges to length ranges of weapons classes such as rifle, pistol, RPG, knives, silverware and mundane items that can be identified as non-threatening or not likely associated with combatants, for example.

Figure 9:
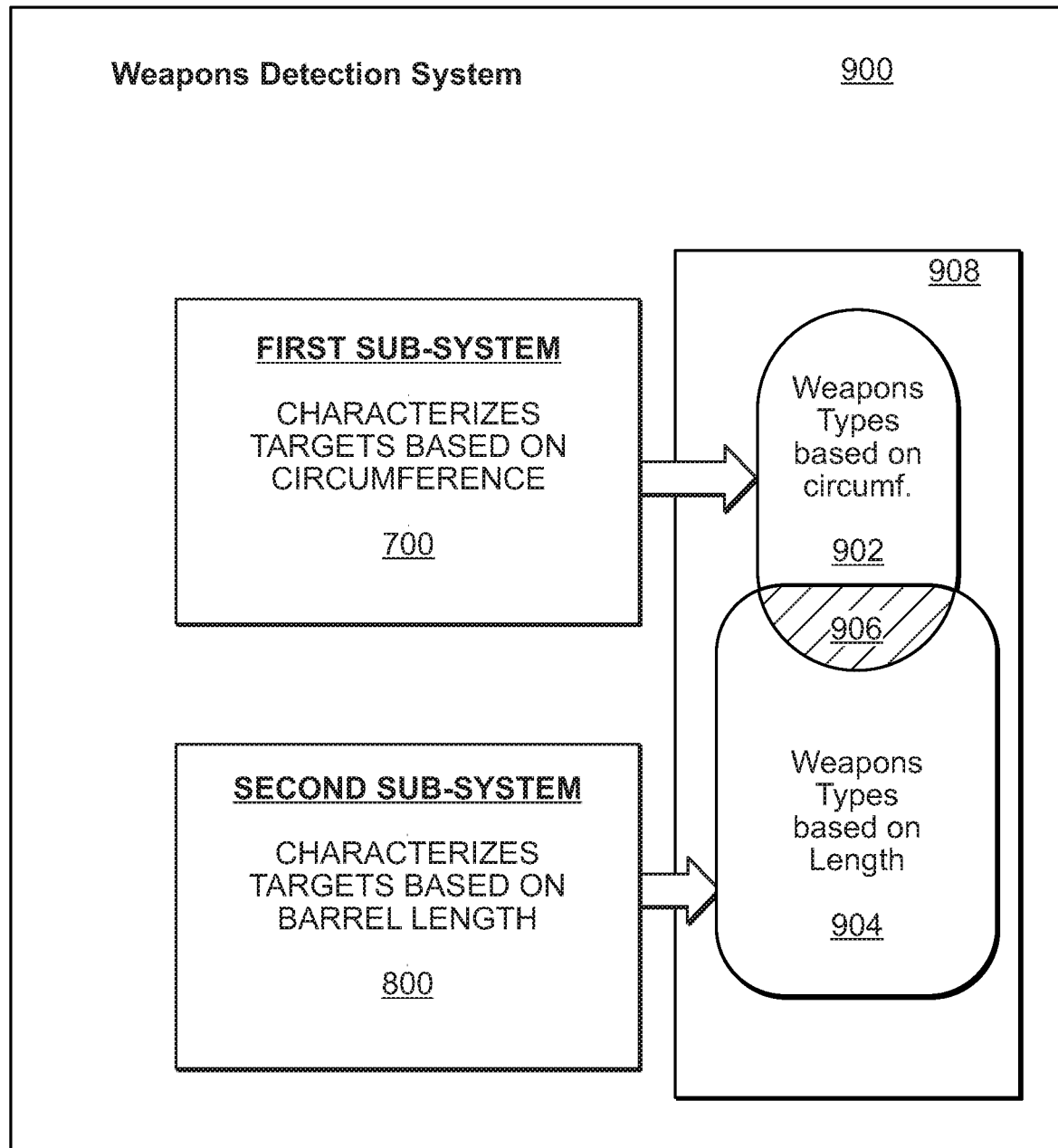
FIG. 9 is a system block diagram showing a weapons detection system including a first sub-system and a second sub-system according to an aspect of the present disclosure.

The length resonance detection techniques described herein exploit the full Mie scattering region and are invariant to the viewing aspect. In an illustrative embodiment, the Mie scattering region for length resonance detection corresponds to ratios of target length to wavelength of the transmitted electromagnetic radiation of about 1:6. The ultra-high frequency range of the transmitted electro-magnetic radiation as used for length resonance detection in the illustrative embodiment is centered around a 73 cm wavelength or about 410 MHz. This frequency range resonates with targets having a length in the range of about 73 cm to 420 cm, FIG. 9 illustrates a weapons detection system 900 according to an aspect of the present disclosure. The weapons detection system 900 includes the first sub-system 700 as described above with reference to FIG. 7 and the second sub-system 800 as described above with reference to FIG. 8 and processing circuitry 908 coupled to the first sub-system 700 and the second sub-system 800. The processing circuitry 908 is configured to identify target types matching both the circumference based target characterizations determined by the first sub-system 700 and the length—based target characterizations determined by the second sub-system 800.

According to an aspect of the present disclosure, electromagnetic radiation returning from the target area is received by the weapons detection system 900 as a return signal. The return signal is processed by the target circumference processing circuitry 710 to identify patterns of circumferential resonances in the return signal and by the target length processing circuitry 810 to identify patterns of length resonance patterns in the return signal. Although the target circumference processing circuitry 710 and the target length processing circuitry 810 are describe separately herein as aspects of separate sub-systems, it should be understood that alternative embodiments of the disclosed weapons detection system 900 may be implemented in which the target circumference processing circuitry 710 and the target length processing circuitry 810 are implemented together in the same circuitry. The patterns of circumferential resonances are compared to a database of resonance signatures by the target circumference processing circuitry 710 to identify weapons types based on their circumference 902. The patterns of length resonances are compared to a database of resonance signatures by the target length processing circuitry 810 to identify weapons types based on their lengths 904. The weapons detection system 900 identifies weapons types based on their circumference and lengths 906 by identifying weapons types that are in the outputs of the first sub-system 700 and the second sub-system 800.

In an illustrative embodiment the weapons detection system 900 may include one or more Time Domain P440 radar transceivers by Time Domain Inc. of Huntsville, Ala. The P440 radar transceiver is an ultrawideband (UWB) radio transceiver capable of operating between 3.1 and 4.8 GHz. This frequency range is suitable for detecting circumference resonances in the Mie scattering region for target weapons having cylinder portions from about 1.8" diameter to about 4.0" diameter. The P440 model transceiver operates with very low power transmissions (~50 uW) and is capable of communicating data between two or more P440 transceiver units. Each P440 transceiver unit includes a location engine which can be used to determine the position of the unit in the three dimensions.

Each P440 transceiver unit can be operated with a single antenna (used for transmit and receive) or with two antennas (where one is dedicated for transmit and the second for receive). In an illustrative embodiment a Broadspec antenna is used with the P440 radar transceiver. The Broadspec antenna has an impedance of about 3 dB and provides an omnidirectional transmit/receive pattern supporting a frequency range of 3.1-5.3 GHz.

Figure 10:
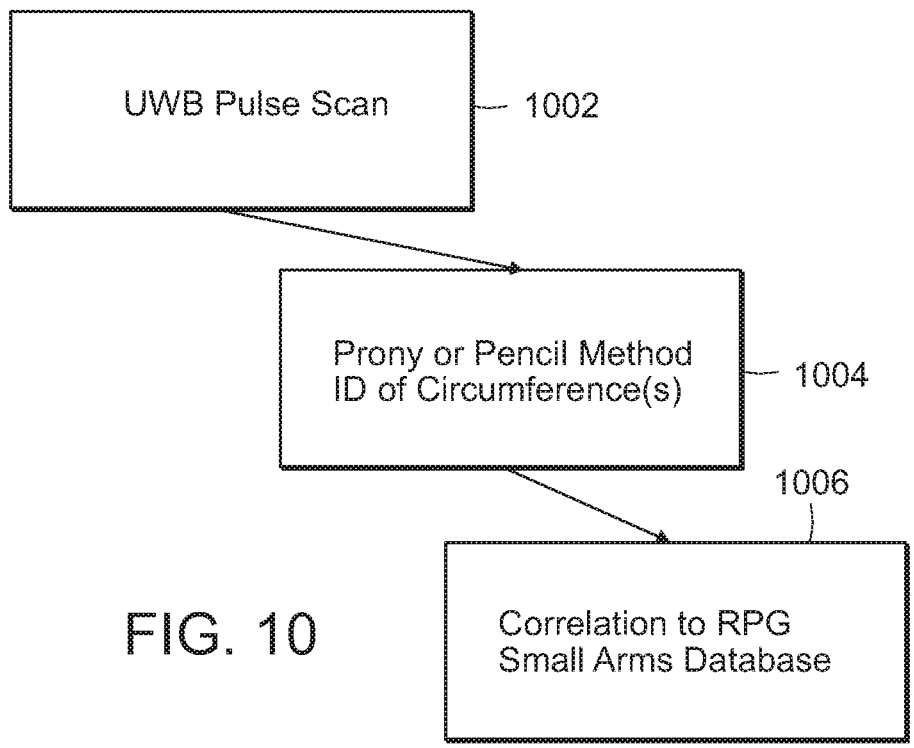
FIG. 10 is a process flow diagram showing steps for performing an ultrawideband pulse reflection process according to an aspect of the present disclosure.

Performing an ultrawideband pulse reflection process at step 602 according to an aspect of the present disclosure is described in more detail with reference to FIG. 10. At step 1002, an ultrawideband pulse scan is performed on a target area to generate an ultrawideband circumferential pulse. At step 1004, a singularity analysis such as a Prony method or Pencil method analysis of the ultrawideband circumferential pulse is performed. Prony method and Pencil method analysis are well known singularity evaluation methods used to model the late time portion of an object's ultrawideband radar response. The end results of the singularity analysis involves the determination of poles and zeroes in the complex plane. At step 1006 the results of the singularity analysis are correlated to a database of poles and zeroes associated with ultrawideband circumferential pulses returned from various small arms and/or rocket propelled grenade tubes, for example, to identify weapons that match the results of the singularity analysis. The ultrawideband reflection process 602 thereby identifies one or more small arms and weapons types based on their circumference.

Although an illustrative embodiment of the ultrawideband pulse reflection process is described with reference to FIG. 10, it should be understood that other methods of analyzing an ultrawideband circumferential pulse to characterize a target based on its circumference may be used within the scope of the present disclosure.

Figure 11:
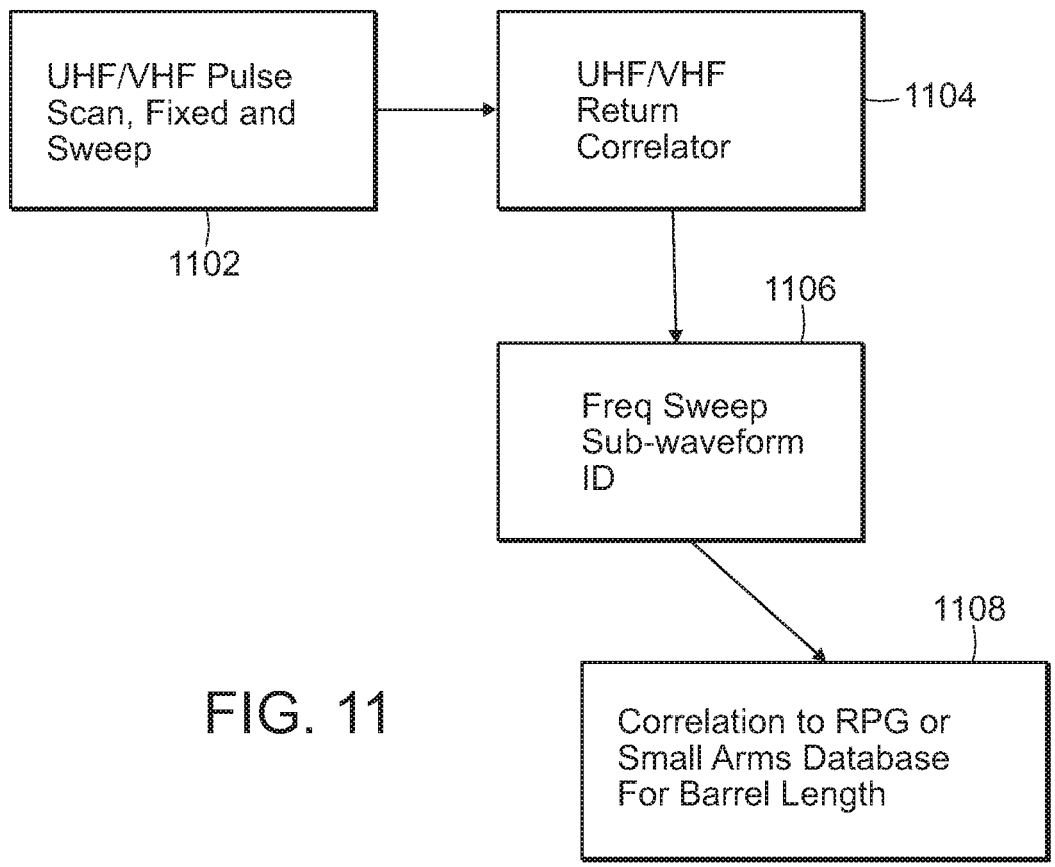
FIG. 11 is a process flow diagram showing steps for performing an ultra-high frequency scan reflection process according to an aspect of the present disclosure.

Performing an ultra-high frequency scan reflection process at step 604 according to an aspect of the present disclosure is described in more detail with reference to FIG. 11. At step 1102, A UHF/VHF pulse fixed scan and sweep scan is transmitted by the ultra-high frequency transmitter circuitry 802 (FIG. 8). At step 1104, a UHF/VHF return correlation is performed by the ultra-high frequency receiver circuitry 808 and/or the length resonance detection circuitry 812. At step 1106, a frequency sweep sub-waveform identification process is performed by the length resonance detection circuitry to characterize a target barrel length. At step 1108, the results of the frequency sweep sub-waveform identification process are correlated to a weapons barrel length in a database of barrel length by the barrel size classifier circuitry 814.

According to an aspect of the present disclosure, synthetic aperture radar imaging may be performed using an array of radar apparatus 204, 304 that simultaneously receives reflections from a target at multiple receiving antenna elements in different locations. Synthetic aperture radar scanning may be implemented with a linear array, a two-dimensional array, or an ad-hoc array of the radar apparatus 204, 304.

According to this aspect, a number of the disclosed radar apparatuses 704 or 704 may act as array elements, which can be dispersed among members of a patrol platoon or a formation of unmanned aircraft systems, for example. The ad hoc array of the disclosed radar apparatuses 704 or 804 can be localized in the array and act together as a large aperture to provide large gain and off beam rejection. In an illustrative embodiment, a number of P440 radar transceivers may be implanted as a multifunction radio frequency system to provide a synthetic aperture radar (SAR) with coherent beampointing and multi static ultrawideband weapons detection.

When weapons are stored in caches, they are often aligned with each other in racks or boxes, for example. This provides multiple targets having the same orientation which may also generate a large reflection for ultrawideband synthetic aperture imaging. In an illustrative embodiment, SAR imaging may be performed to identify large reflections from weapons caches without relying on circumferential resonance detection and/or length resonance detection. According to an aspect of the present disclosure, synthetic aperture radar in a particular array configuration may be used to generate a baseline SAR image of a target area for later comparison with updated SAR images using the same array configuration. This techniques can identify substantial changes in an SAR image that may represent the introduction of a weapons cache to the target area, for example.

In another illustrative embodiment synthetic aperture radar scanning may be implemented in the 2 GHz to 8 GHz range to detect weapons based on their barrel length resonances. The detected barrel length resonances may be cross-compared to an ultrawideband synthetic aperture radar image of stored threats to identify hidden weapons caches.

The use of SAR scanning combined with circumference resonance detection and length resonance detection as described herein may significantly improve the accuracy and reliability of weapons detections and may reduce the high number of false detections generated by other radar type weapons detections systems.

What is claimed is:

1. A system for detecting concealed weapons, the system comprising:

a first radar emitter configured for emitting electromagnetic energy in an ultrawideband frequency range;

a first radar receiver configured for receiving reflected electromagnetic energy in the ultrawideband frequency range, wherein the reflected electromagnetic energy in the ultrawideband frequency range was emitted from the first emitter and reflected to the first receiver at one or more circumferential resonance frequencies, wherein the circumferential resonance frequencies correspond to a circumference of a target weapon;

a first processing circuit coupled to the first receiver, the first processing circuit configured to determine circumferential resonance frequencies of the reflected electromagnetic energy in the ultrawideband frequency range and to compute the circumference of the target weapon based on the circumferential resonance frequencies;

a second radar emitter configured for emitting electromagnetic energy in an ultra-high frequency and/or very high frequency range;

a second radar receiver configured for receiving reflected electromagnetic energy in the ultra-high frequency and/or very high frequency range, wherein the reflected electromagnetic energy in the ultra-high frequency and/or very high frequency range was emitted from the second emitter and reflected to the second receiver at one or more length resonance frequencies, wherein the length resonance frequencies correspond to a length of the target weapon;

a second processing circuit coupled to the second receiver, the second processing circuit configured to determine the length resonance frequencies of the reflected electromagnetic energy in the ultra-high frequency and/or very high frequency range and to compute the target length based on the length resonance frequencies; and a third processing circuit coupled to the first processing circuit and the second processing circuit, the third processing circuit configured to compare the target length and the target circumference to a predetermined list of length characteristics and circumference characteristics of corresponding weapons types, and to identify a weapon type of the target based on the comparison.

2. The system of claim 1 wherein the one or more circumferential resonance frequencies and the one or more length resonances frequencies are in a Mie scattering region.

3. The system of claim 1 wherein the electromagnetic energy emitted by the first radar emitter in the ultrawideband frequency range has a frequency of between 3 gigahertz and 5.3 gigahertz.

4. The system of claim 1, wherein the electromagnetic energy emitted by the second radar emitter in the ultrahigh frequency range has a frequency between 200 megahertz and 900 megahertz.

5. A method for detecting concealed weapons, the method comprising:

emitting electromagnetic energy toward a target area in an ultrawideband frequency range at one or more circumferential resonance frequencies, wherein the circumferential resonance frequencies correspond to a circumference of a target weapon;

receiving reflected electromagnetic energy from the target area in the ultrawideband frequency range;

determining circumferential resonance frequencies of the reflected electromagnetic energy in the ultrawideband frequency range;

computing the circumference of the target weapon based on the circumferential resonance frequencies;

emitting electromagnetic energy in an ultra-high frequency and/or very high frequency range corresponding to one or more length resonance frequencies, wherein the length resonance frequencies correspond to a length of the target weapon;

receiving reflected electromagnetic energy in the ultra-high frequency and/or very high frequency range;

determining the length resonance frequencies of the reflected electromagnetic energy in the ultra-high frequency and/or very high frequency range;

computing the target length based on the length resonance frequencies;

comparing the target length and the target circumference to a predetermined list of length characteristics and circumference characteristics of corresponding weapons types; and identifying a weapon type of the target based on the comparison.

6. The method of claim 5, wherein the one or more circumferential resonance frequencies and the one or more length resonances frequencies are in a Mie scattering region.

7. The method of claim 5 wherein the electromagnetic energy emitted by the first radar emitter in the ultrawideband frequency range has a frequency of between 3 gigahertz and 5.3 gigahertz.

8. The method of claim 5, wherein the electromagnetic energy emitted by the second radar emitter in the ultrahigh frequency range has a frequency between 200 megahertz and 900 megahertz.

9. An apparatus for detecting concealed weapons, the apparatus comprising:

a first sub-system configured for generating a circumference based target characterization based circumferential resonance frequencies in a wideband radar return from the target;

a second sub-system configured for generating a length based target characterization based on an ultra-high frequency radar return;

processing circuitry coupled to the first sub-system and the second sub-system, the processing circuitry configured to identify target types matching the circumference based target characterization and the length based target characterization.

10. The apparatus of claim 9, wherein the first sub-system comprises:

ultrawideband transmitter circuitry configured for emitting electromagnetic energy in an ultrawideband frequency range;

ultrawideband receiver circuitry configured for receiving reflected electromagnetic energy in the ultrawideband frequency range; and target circumference processing circuitry coupled to the ultrawideband receiver circuitry.

11. The apparatus of claim 10, wherein the reflected electromagnetic energy in the ultrawideband frequency range was emitted from the ultrawideband transmitter circuitry and reflected to the ultrawideband receiver circuitry at one or more circumferential resonance frequencies.

12. The apparatus of claim 11, wherein the circumferential resonance frequencies correspond to a circumference of a target weapon.

13. The apparatus of claim 10, wherein the target circumference processing circuitry is configured to determine circumferential resonance frequencies of the reflected electromagnetic energy in the ultrawideband frequency range and to compute the circumference of the target weapon based on the circumferential resonance frequencies.

14. The apparatus of claim 12, wherein the one or more circumferential resonance frequencies are in a Mie scattering region.

15. The apparatus of claim 9, wherein the second subsystem comprises:
- a ultra-high frequency transmission circuitry configured for emitting electromagnetic energy in an ultra-high frequency range;
- ultra-high frequency receiver circuitry configured for receiving reflected electromagnetic energy in the ultra-high frequency range;
- target length processing circuitry coupled to the ultra-high frequency receiver circuitry.

16. The apparatus of claim 15, wherein the reflected electromagnetic energy in the ultra-high frequency was emitted from the ultra-high frequency transmission circuitry and reflected to the ultra-high frequency receiver circuitry at one or more length resonance frequencies.

17. The apparatus of claim 16, wherein the length resonance frequencies correspond to a length of the target weapon.

18. The apparatus of claim 16, wherein the one or more length resonances frequencies are in a Mie scattering region.

19. The apparatus of claim 15 wherein the target length processing circuitry is configured to determine the length resonance frequencies of the reflected electromagnetic energy in the ultra-high frequency range and to compute the target length based on the length resonance frequencies.

20. The apparatus of claim 9 wherein the processing circuitry is configured to compare the target length and the target circumference to a predetermined list of length characteristics and circumference characteristics of corresponding weapons types, and to identify a weapon type of the target based on the comparison.

* * * * *